United States Patent Office 3,445,411
Patented May 20, 1969

3,445,411
LOW FILM PRIMER AND RESINS
UTILIZED THEREIN
Leroy A. Dunham and William J. Belanger, Louisville,
Ky., assignors to Celanese Coatings Company, New
York, N.Y., a corporation of Delaware
No Drawing. Continuation-in-part of application Ser. No.
447,949, Apr. 14, 1965. This application June 6, 1967,
Ser. No. 643,846
Int. Cl. C09d 5/02, 3/28
U.S. Cl. 260—22                                14 Claims

ABSTRACT OF THE DISCLOSURE

Novel low film paint primers containing novel water soluble amine-containing resins produced in a specific manner and combination from an esterified product of cyclopentadiene containing hydrocarbon resin modified unsaturated fatty acid and an aliphatic polyol, said esterified product adducted with an alpha, beta-ethylenically unsaturated aliphatic dicarboxylic acid to form an adduct and a polyepoxide resin reacted with said adduct.

---

The present application is a continuation-in-part application of our copending application Ser. No. 447,949, filed Apr. 14, 1965, now abandoned.

The present invention relates to novel low film paint primers, novel water soluble amine resins and process for producing said resin. More particularly, the invention is directed to novel paint primers especially for dipping metals into said primer which provide an average film thickness in the range between 0.0002 to about 0.0004 inch which provides good edge cover and outstanding corrosion resistance. The invention is further directed to the novel water reducible resins, and amine containing water reducible resins producing water soluble resins which are used as a vehicle for said low film paint primers.

Many unsuccessful attempts have been made in the prior art to provide a low film paint primer (by dipping, spraying or the like) especially for metals, which provide adequate cover (i.e., good edge cover, water resistance, corrosion resistance among others) at an average thickness below 0.0005 inch. Typical of the resins used in the manufacture of paint primers for dipping and spraying metals are described in U.S. Patents 3,098,834 and 3,251,790 but the paint primers produced with these resins do not provide adequate protection such as good edge cover, water resistance and corrosion resistance when applied at a thickness below 0.0005 inch.

Compositions of paint primers, water soluble amine resins used in the production of these paint primers, water reducible resins and a process for producing the resins have been discovered which have outstanding properties in the coating area and particularly, the paint primers can be applied to metals, the primer having an average thickness below 0.0005 inch and between about 0.0002 to about 0.0004 inch yet providing good edge cover, outstanding corrosion resistance, good water resistance among others. The resins of this invention, free of gelation or precipitation, can be obtained by initially producing a cyclopentadiene containing hydrocarbon resin modified higher unsaturated fatty acids whereby the acid portion contains from 12 to 23 carbon atoms, and having an acid number in the range from about 50 to about 180. To the modified unsaturated fatty acid, a sufficient amount of an aliphatic saturated polyol containing from 2 to 12 carbon atoms and containing at least 2 hydroxyl groups is esterified so as to provide a combined product having an acid value in the range from about 30 to about 100. This combined product is then reacted with an aliphatic alpha, beta ethylenically unsaturated dicarboxylic acid containing from 4 to 12 carbon atoms in amounts from about 5 to about 15 weight percent of the combined product to produce an adduct. The adduct is then reacted with about 2 to about 15 weight percent of an aromatic-containing polyepoxide having an epoxide equivalent weight in the range from about 70 to about 525. A water soluble resin is produced by the neutralization of at least 50 percent of the acidity of the water reducible resin with ammonia, amines or quaternary ammonium hydroxides. The paint primer of this invention is produced by the combination of about 15 to about 50 weight percent polymeric latex and 70 to 85 weight percent of a mixture comprising an aqueous amine water soluble resin (described above) and pigmentation. The solids of the primer have an appropriate particle size so that all particles can pass through a 200 mesh screen, preferably 250 mesh screen. The ratios of the pigment to the binder, free of water, ranges from about 0.5:1 to about 2.1:1. Water is added or withdrawn as required to obtain the desired viscosity of the primer paint.

The primer paints of this invention are particularly useful as protective paints for metal surfaces, especially in the automobile industry. The fact that these primer paints are water-based and nonflammable permits them to be utilized in large open tanks into which the entire automobile body or a portion thereof can be dipped to give an exceptionally thin, corrosion resistant surface over which a topcoat can be sprayed to provide a coating system which offers excellent appearance as well as unusual freedom from corrosion and other deficiencies. In some applications, such as on the underside of automobile bodies, these compositions can be utilized to advantage even without topcoats. A very distinct advantage is available in that such thin films can be utilized in the undercoating of an automobile body that essentially no demarcation line can be seen between the undercoating and the layer of paint on the upper surface yet the undercoating is free from corrosion and other deficiencies.

To produce the novel water reducible resin, a cyclopentadiene containing hydrocarbon resin is initially reacted with a higher unsaturated fatty acid at temperatures in the range from about 300° F. to about 500° F. to form a cyclopentadiene containing hydrocarbon resin modified higher unsaturated fatty acid having an acid number in the range from about 50 to about 180, more preferably in the range from about 125 to about 150. The unsaturated hydrocarbon resin utilized herein is the cyclopentadiene-containing type which can be obtained from petroleum distillates. These types of hydrocarbon resins are described in such publications as "Official Digest," May 1956, page 372; Organic Coating Technology, Vol. 1, published 1954, John Wiley and Sons, page 188 among others. The unsaturated hydrocarbon resins utilized herein are those having softening points below 250° F. and iodine values in the range from about 100 to about 300. The higher unsaturated fatty acids which are chemically reacted with the unsaturated hydrocarbon resin include linoleic acid and the like and those which can be derived from drying, semidrying and nondrying oils such as tall oil fatty acids, linseed oil fatty acids, perilla oil fatty acids, safflower oil fatty acids, soybean oil fatty acids, sunflower fatty acids, tung oil fatty acids, oiticica oil fatty acids, cottonseed oil fatty acids, fish oil fatty acids, and the like. The preferred fatty acids are those wherein the acid portion contains from 12 to 23 carbon atoms. The amount of unsaturated hydrocarbon resin that can be used, can range from about 25 to 95 weight percent of the total cyclopentadiene containing hydrocarbon resin modified higher unsaturated fatty acids while 5 to 75 weight percent relates to the unsaturated fatty acid.

The cyclopentadiene-containing hydrocarbon resin modified higher unsaturated fatty acid, described above, is then reacted under esterification conditions with a sufficient amount of an aliphatic saturated polyol containing from 2 to 12 carbon atoms and containing at least 2 hydroxyl groups to provide a combined product having an acid value in the range from about 30 to about 100, preferably in the range from about 50 to about 65. The amount of polyol which can be utilized range from about 30 to about 60% in amounts so that of available carboxy groups available in the cyclopentadiene-containing hydrocarbon resin modified higher unsaturated fatty acid product is esterified. Typical of the polyols which can be utilized include, among others: ethylene glycol; propylene glycol; pentaerythritol; glycerin; trimethylolpropane; sorbitol; 1,3-propylene glycol; 1,4-dihydroxy butane; 2-ethyl 1,6-dihydroxyhexane; triethylene glycol; decamethylene glycol; hexamethylene glycol; mannitol; arabitol; 1,2,3-trihydroxypropane; 1,2,3-trihydroxybutane; 1,2,3-hydroxybutane and the like.

The polyol combined cyclopentadiene-containing hydrocarbon resin modified higher unsaturated fatty acid product is then reacted with an aliphatic alpha, beta-ethylenically unsaturated dicarboxylic acid or anhydrides containing from 4 to 12 carbon atoms to form an adduct. The unsaturated dicarboxylic acid anhydride utilized in forming the adduct is an alpha, beta-ethylenically unsaturated dicarboxylic acid anhydride such as maleic anhydride, itaconic anhydride, and the like. Instead of the anhydride, it is also possible to utilize ethylenically unsaturated dicarboxylic acids which form anhydrides, for example maleic acid or itaconic acid. These acids probably function by first forming the anhydride. Fumaric acid, which does not form an anhydride, may also be utilized, although with considerably more difficulty than the unsaturated dicarboxylic acid anhydrides or the unsaturated dicarboxylic acids which form anhydrides. Mixtures of the acids and anhydrides may also be utilized. The amount of alpha-beta ethylenically unsaturated dicarboxylic acid or anhydride used ranges from about 5 to about 15 weight percent, preferably from 8 to 12 weight percent, of the total reacted product to that point. The adduct reaction can take place readily without the use of a catalyst and at temperatures in the range from about 212° F. to about 550° F. preferably in the range from about 350° F. to about 425° F.

The adduct produced is then reacted with about 2 to about 15 weight percent (based on the total reaction product), preferably from about 7 to about 10 weight percent of an aromatic containing polyepoxide resin having an epoxide equivalent in the range from about 170 to about 525, preferably in the range from about 175 to about 210. The aromatic containing polyepoxide resins can be esters or ethers or a combination of both. Typical of the ether epoxide are those described in U.S. Patents 2,615,007 and 2,615,008. Preferred resins include the diglycidyl ether of bis(4-hydroxyphenyl) dimethylmethane; glycidyl ethers of glycerol, glycidyl ethers of bisphenol F; glycidyl ethers of tetrakis(hydroxyphenyl) ethane; epoxylated novolacs; and the like. The epoxide addition occurs at temperatures in the range from about 212° F. to about 500° F. preferably in the range from 300° F. to 425° F. The term "epoxide equivalent" as used herein and known in the art is the weight of resin in grams which contains 1 gram chemical equivalent of epoxy. Low molecular-weight resins have an epoxide equivalent in the 175 to 200 range; higher-weight resins correspondingly higher values, since in each such molecule there are long chains between the epoxy groups.

The unusual feature of the water reducible resins of the invention relates to the fact that the epoxide resins are added to the adducts where normally the reverse process of adding the alpha-beta ethylenically unsaturated dicarboxylic acid or anhydride to the epoxide resin is utilized. It is extremely important that the amount of alpha-beta ethylenically unsaturated dicarboxylic acid and epoxide resins are carefully controlled to avoid gelation or precipitation.

The acidity of the water reducible resin described above is then neutralized to at least 50 percent of its original figure with ammonia or an amine or a quaternary ammonium hydroxide to produce a water soluble resin. Among the amines which may be utilized are those capable of forming water soluble salts, for example, primary, secondary and tertiary amines such as methylamine, ethylamine, proplyamine, dimethylamine, diethylamine, dipropylamine, dihexylamine, trimethylamine, triethylamine, tripropylamine, tributylamine, trihexylamine, monoethanolamine, monobutanolamine, diethanolamine, dibutanolamine, triethanolamine, tributanolamine morpholine, and the like.

The quaternary ammonium hydroxides which may be employed include trimethylbenzyl ammonium hydroxide, triethylbenzyl ammonium hydroxide, trimethyllauryl ammonium hydroxide, triethyllauryl ammonium hydroxide, tributyllauryl ammonium hydroxide, and the like.

Preferably, the pH of the neutralized and solubilized adduct should be maintained in the range of about 7.5–9.0. If the pH is substantially higher than 9.0 the viscosity will be substantially lowered and may drift downwardly, whereas if the pH is lower than about 7.5, the viscosity will be increased to the point that the material may be too viscous for practical use at a reasonable solids content by ordinary application techniques, and if below 6.0 an unstable resin will result. However, it is an advantage of the materials described herein that the viscosity can readily be maintained within the described range simply by adjustment of the pH to bring it within the 7.5–9.0 pH range.

The amine containing water soluble resin of this invention is then combined with polymeric latex and pigmentation which is used to make primers nad having a size so that all particles will pass through a 200 mesh screen, preferably 250 mesh screen, to form a primer of sufficient viscosity for producing a film by spraying, dipping and the like, having an average thickness below 0.0004 inch which can provide good edge cover and corrosion resistance.

The polymeric latex which can be used in the production of the primer can include, among others; acrylate latex, polyvinyl chloride latex, vinylidene chloride-acrylonitrile latex, vinylidene chloride vinyl chloride latex, polyvinyl actate latex, styrene-butadiene latex, polystyrene latex and the like. The polymeric latex used in the primer can range from about 15 to about 50 weight percent of the primer, preferably from about 15 to 30 and more preferably in the range from about 17 to about 25 weight percent. The preferred latex is a styrene-butadiene copolymer latex containing 46 percent resin solids, having a specific gravity at 25° C. of 1.01, a pH of 4±0.5, a Brookfield viscosity in centipoises at 25° C. of 29 at 20 r.p.m. and a particle size wherein all the particles pass through a 200 mesh, preferably a 250 mesh screen.

The pigmentation which is added to produce the primer can include those pigments which prevent or retard corrosion and at the same time impart the usual properties of color, hiding power, and the film build. Typical of the pigments which are used in corrosion inhibiting coatings include, among others: red lead, blue lead, lead suboxide, basic lead silico chromate, zinc yellow, basic lead zinc chromate, zinc dust, zinc oxide, strontium chromate, calcium plumbate and the like. Other pigments can be used in combination with the corrosion inhibitor pigments such as lampblack, titanium dioxide, lithopone, magnesium silicate, talc, barytes and the like. The preferred pigment used as a corrosion inhibitor is basic lead silico chromate in amounts of at least about 10 weight percent to 100 weight percent; if desired. The weight ratio of pigment to binder (i.e., resin plus latex), free of water, ranges from about 0.5:1 to about 2.1:1, preferably in the range from about 1.3:1 to about 1.7:1.

In the production of primer paints cosolvents can be used to improve water miscibility and also utilized as solvents for film forming components. Typical solvents which can be used include cellosolves such as butyl Cellosolve, Caritol such as Carbitol acetate, aliphatic alcohols, thioalcohols, ethers such as 2-butoxyethanol, ketones, esters and the like.

The viscosity of the primer paint can be adjusted to any viscosity desired by the addition or deletion of water. Normally, the package viscosity of the primer paint can range from about 15 to about 40 seconds, preferably in the range from about 20 to about 30 seconds measured in a #4 Ford Cup 80° F., a standard testing technique. The application and dipping viscosity can range from about 11 to about 12 seconds measured as above.

The following examples will serve to illustrate the process and new compositions of the present invention without limiting the same:

Example 1

To a two liter flask equipped with thermometer, stirrer and reflux condenser is added 55.63 parts of tall oil fatty acids and heated to 450° F. with 22 parts of cyclopentadiene hydrocarbon resin having a melting point (determined by the conventional ball and ring method) of 221° F., a viscosity at 25° C. at 70% by weight solids in toluene of 320 centipoises, a Gardner color at 70% solids of 12–13, an iodine number of 125 and a specific gravity at 25° C. of 1.10 for one hour and the reaction mixture is cooled to 300° F. and 3.85 parts of ethylene glycol is added. The reaction mixture is then heated to 370–380° F., which temperature range is held until an acid value of 50–55 is reached. The reaction mixture is then cooled to 300° F. and 10 parts of maleic anhydride is added. The reaction mixture is then heated to 490° F. and held at that temperature for about one hour to permit adduction of all the maleic anhydride as determined by a negative result in the potassium permanganate test. This test consists of extracting the resin with water and adding to the water extract a few drops of a 0.05 N potassium permanganate solution. If the solution remains pink (i.e., positive result) no free anhydride remains. After the adduction reaction the temperature of the reaction mixture is again lowered to 300° F. and 8 parts of the 1,2-epoxide resin which is the diglycidyl ether of bis(4-hydroxyphenyl) dimethylmethane having an epoxide equivalent weight of 190, an hydroxyl equivalent weight of 85 and a viscosity of 12,000–16,000 centipoises, is added and esterification is carried out at 400° F. whereby the acid value of the resin is lowered from 103 to 59; the batch is cooled to 185° F. and 1½ moles of deionized water per mole of maleic anhydride is added and 1 milliliter of triethyl amine per 194 milliliters of water is added as a catalyst whereby hydrolysis is effected at 195–200° F. until a 60% nonvolatile solids solution of the resinous adduct in a highly aromatic organic solvent having a boiling range of 313–398° F. and a minimum flash point of 100° F. ("70 Plus Solvent") has a viscosity (Gardner Holdt) of U–V (it having been N–O before hydrolysis) and an acid value of 76.

| Example | 2 | 3 | 4 | 5 |
|---|---|---|---|---|
| Tall oil fatty acids | 55.63 | 59.35 | 56.99 | 49.79 |
| Ethylene glycol | | 4.11 | 3.85 | |
| Pentaerythritol | 4.47 | | | |
| Maleic anhydride | 10.00 | 7.00 | 10.00 | 8.00 |
| Diglycidyl ether of bis(4-hydroxyphenyl) dimethylmethane | 5.00 | 5.00 | 8.20 | 10.00 |
| Deionized water | 2.76 | 1.93 | 2.76 | 2.21 |
| Cyclopentadiene hydrocarbon resin polymer | 22.00 | 25.00 | 22.00 | 30.00 |

In a manner similar to Example 1, the following water reducible resins were prepared utilizing the diglycidyl ether of bis(4-hydroxyphenyl) dimethylmethane as identified in Example 1.

The resins of Examples 1 through 5 were formulated into primer paints in the following manner:

38 parts of resin were solubilized with 62 parts of the following solvents:

| | Parts |
|---|---|
| Diethanolamine | 11.16 |
| 2-butoxyethanol | 11.16 |
| Water | 77.68 |

80 parts of solubilized resin were combined with 20 parts of styrene-butadiene copolymer latex. The latex contains 46 percent resin solids, has a specific gravity at 25° C. of 1.01, a pH of 4±0.5, a Brookfield viscosity in centipoises at 25° C. of 20 at 20 r.p.m. and a particle size wherein all particles will pass through a 250 mesh screen. The pigment to binder weight (latex plus resin) ratio is 1 to 9. Suitable pigments used include 100 percent basic lead silico chromate and zinc chromate. A highly desirable pigmentation formulation was as follows:

| | Parts |
|---|---|
| Lampblack | 3.24 |
| Titanium dioxide | 4.43 |
| Lithopone | 50.69 |
| Basic lead silico chromate | 22.95 |
| Magnesium silicate | 18.69 |
| | 100.00 |

The viscosity of the primer was adjusted to 11 to 12 seconds #4 Ford Cup with water to obtain the best conditions for dipping metals into said primer and provide films on baking at 325° F. having a thickness of 0.0002 inch. All primers formulated from the resins of Examples 1 to 5 provided a coated panel having good edge cover and which was exposed to salt water for 10 days without corrosion or rust according to the accepted corrosion test ASTM B–117–61.

For comparative purposes, the examples in U.S. Patents 3,098,834 and 3,251,790 (especially Example V) can be duplicated to produce a primer paint and tested in the same manner as described above. The results would indicate that when primer paint films of U.S. 3,098,834 and 3,251,790 are produced in film thickness of 0.0005 and greater, good edge cover and corrosion resistance is obtained. At film thickness below 0.0005 inch and specifically at 0.0002 inch, in many instances good edge cover is obtained but corrosion resistance is not considered acceptable.

It is to be understood that the foregoing description is merely illustrative of preferred embodiments of the invention of which many variations may be made by those skilled in the art within the scope of the following claims without departing from the spirit thereof.

What is claimed is:

1. A method of preparing a water reducible resin, free of gelation, comprising the reaction product of cyclopentadiene-containing hydrocarbon resin modified higher unsaturated fatty acids containing from 12 to 23 carbon atoms having an acid number in the range from about 50 to about 180 with a sufficient amount of aliphatic polyol containing from 2 to 12 carbon atoms and containing at least 2 hydroxyl groups utilizing esterification conditions to provide a combined product having an acid value in the range from about 30 to about 100; said combined product reacted with an alpha, beta-ethylenically unsaturated dicarboxylic acid or anhydride containing from 4 to 12 carbon atoms, to form an adduct, said acid or anhydride present in amounts ranging from 5 to 15 weight percent of said combined product, said adduct reacted with 2 to 15 weight percent of an aromatic containing polyepoxide resin having an epoxide equivalent in the range from about 170 to about 525.

2. The process of claim 1 wherein the unsaturated fatty acid is tall oil fatty acid, the polyol is selected from the group consisting of ethylene glycol and pentaerythritol; the alpha-beta unsaturated dicarboxylic acid is maleic anhydride, and the epoxy resin is the diglycidyl ether of bis(4-hydroxyphenol) dimethylmethane having an epoxide equivalent in the range from about 170 to about 230.

3. The process of claim 2 wherein the polyol is ethylene glycol and the epoxy resin has an average epoxide equivalent of about 190.

4. The process of claim 3 wherein the product has at least about 50 percent of its acidity neutralized with a member of the class consisting of ammonia, amines and quaternary ammonium hydroxides to produce a water soluble resin.

5. A water reducible resin, free of gelation, comprising an esterified product of an aliphatic polyol containing 2 to 12 carbon atoms and containing at least 2 hydroxyl groups and a cyclopentadiene-containing hydrocarbon resin modified unsaturated fatty acids containing from 12 to 22 carbon atoms and having an initial acid value in the range from 30 to 100, about 5 to about 15 weight percent based on the total product of an unsaturated aliphatic dicarboxylic acid anhydride containing from 4 to 12 carbon atoms combined with said esterified product to form the corresponding adduct, and about 2 to about 15 weight percent based on the total product of an aromatic containing polyepoxide resin having an average epoxide equivalent in the range from 170 to about 525.

6. The resins of claim 5, wherein the product has at least about 50 percent of its acidity neutralized with a member of the class consisting of ammonia, amines and quaternary ammonium hydroxides to produce a water soluble resin.

7. The resins of claim 5 wherein:
(1) the esterified product has an acid number in the range from 50 to 65,
(2) the aliphatic polyol is ethylene glycol,
(3) the unsaturated fatty acid is tall oil fatty acid,
(4) the aliphatic dicarboxylic acid anhydride is maleic anhydride in amounts ranging from 8 to 12 weight percent based on the total solids,
(5) the aromatic containing polyepoxide is the diglycidyl ether of bis(4-hydroxyphenyl) dimethylmethane having an average epoxide equivalent of 190.

8. The resin of claim 7 having at least about 50 percent of its acidity neutralized with a member of the class consisting of ammonia, amines and quaternary ammonium hydroxides to produce a water soluble resin.

9. A primer of sufficient viscosity for producing a film having an average thickness below 0.0004 inch which shows good edge cover and outstanding corrosion resistance comprising from about 15 to about 50 weight percent polymeric latex and 70 to 85 weight percent of a mixture comprising an aqueous amine solution of the composition of claim 6 and pigmentation, said pigmentation having a particle size so that all particles can pass through a 200 mesh screen, the weight ratios of pigment to the resin of claim 6, and latex, free of water, ranges from about 0.5:1 to about 2.1:1, the desired viscosity of said primer obtained by the deletion or addition of water as required.

10. The primer of claim 9 wherein the size of particles are such that all will pass through a 250 mesh screen and the pigmentation comprises at least about 10 weight percent of basic lead silico chromate of said pigmentation.

11. The primer of claim 9 wherein the polymeric latex ranges from 17 to 25 weight percent and the weight ratios of pigment to the resin of claim 6 and latex, free of water, ranges from about 1.3:1 to about 1.7:1.

12. The primer of claim 11 wherein the resin product has at least about 50 percent of its acidity neutralized with a member of the class consisting of ammonia, amines and quaternary ammonium hydroxides to produce a water soluble resin.

13. The primer of claim 11 wherein all particles present will pass through a 250 mesh screen and wherein the pigmentation contains:

| | Weight percent |
|---|---|
| Lampblack | 2–5 |
| Titanium dioxide | 2–6 |
| Lithopone | 40–60 |
| Basic lead silico chromate | 10–30 |
| Magnesium silicate | 10–30 |

The total percentage never exceeds 100 weight percent.

14. The primer of claim 13, wherein the polymeric latex is a styrene-butadiene copolymer and the resin product has at least about 50 percent of its acidity neutralized with a member of the class consisting of ammonia, amines and quaternary ammonium hydroxides to produce a water soluble resin.

References Cited

UNITED STATES PATENTS

| | | | |
|---|---|---|---|
| 2,887,459 | 5/1959 | Carmody | 260—22 |
| 2,992,197 | 7/1961 | Boller | 260—22 |
| 3,027,341 | 3/1962 | Boucher et al. | 260—22 |
| 3,088,927 | 5/1963 | Dissen | 260—22 |
| 3,098,834 | 7/1963 | Jerabek | 260—23.7 |
| 3,230,162 | 1/1966 | Gilchrist | 260—22 |
| 3,251,790 | 5/1966 | Christenson et al. | 260—18 |
| 3,305,501 | 2/1967 | Spalding | 260—18 |
| 3,375,214 | 3/1968 | Bennett | 260—22 |

DONALD E. CZAJA, Primary Examiner.

R. W. GRIFFIN, Assistant Examiner.

U.S. Cl. X.R.

260—29.2, 29.6, 23.7, 29.7, 32.4, 32.6, 33.4, 40, 41, 41.5; 117—134, 167